United States Patent
Enohara et al.

(10) Patent No.: US 9,513,804 B2
(45) Date of Patent: Dec. 6, 2016

(54) VIRTUAL TAPE DEVICE AND VIRTUAL TAPE DEVICE CONTROL METHOD

(71) Applicant: FUJITSU LIMITED, Kawasaki-shi, Kanagawa (JP)

(72) Inventors: Katsuo Enohara, Kawaguchi (JP); Fumio Matsuo, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 14/202,292

(22) Filed: Mar. 10, 2014

(65) Prior Publication Data
US 2014/0189232 A1  Jul. 3, 2014

Related U.S. Application Data

(63) Continuation of application No. PCT/JP2011/072105, filed on Sep. 27, 2011.

(51) Int. Cl.
G06F 3/06 (2006.01)

(52) U.S. Cl.
CPC .......... *G06F 3/0604* (2013.01); *G06F 3/065* (2013.01); *G06F 3/0611* (2013.01); *G06F 3/0686* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,287,459 | A * | 2/1994 | Gniewek | 711/111 |
| 5,619,690 | A | 4/1997 | Matsumani et al. | |
| 6,967,802 | B1 * | 11/2005 | Bailey | 360/72.1 |
| 7,447,714 | B1 * | 11/2008 | Mackrory | G06F 11/1464 707/659 |
| 2005/0038954 | A1 * | 2/2005 | Saliba | 711/100 |
| 2008/0263274 | A1 * | 10/2008 | Kishi | G06F 3/0623 711/114 |
| 2009/0240877 | A1 * | 9/2009 | Taniyama | G06F 3/0605 711/111 |
| 2011/0149707 | A1 * | 6/2011 | Ozeki et al. | 369/84 |

FOREIGN PATENT DOCUMENTS

| | | |
|---|---|---|
| JP | 07-073090 | 3/1995 |
| JP | 11-031376 | 2/1999 |
| JP | 2001-273176 | 10/2001 |
| JP | 2004-227594 | 8/2004 |
| JP | 2005-122765 | 5/2005 |
| JP | 2006-294052 | 10/2006 |
| JP | 2008-135055 | 6/2008 |
| JP | 2009-169475 | 7/2009 |

OTHER PUBLICATIONS

International Search Report, mailed in connection with PCT/JP2011/072105 and mailed Jan. 10, 2012.

* cited by examiner

*Primary Examiner* — Jared Rutz
*Assistant Examiner* — William E Baughman
(74) *Attorney, Agent, or Firm* — Fujitsu Patent Center

(57) ABSTRACT

A virtual tape device includes a determination unit and a copy creation unit. The determination unit determines, when deleting some logical volume data among a plurality of logical volume data stored on a first physical tape, whether to conduct copy processing to store a copy of the logical volume data onto a second physical tape on the basis of a storage location of the logical volume data. The copy creation unit stores, when it is determined to conduct the copy processing, a copy of the logical volume data on the second physical tape so as to cause spacing between a storage location of the logical volume data on the second physical tape and a head location on the second physical tape to become shorter than spacing between a storage location of the logical volume data on the first physical tape and a head location on the first physical tape.

16 Claims, 12 Drawing Sheets

FIG.2
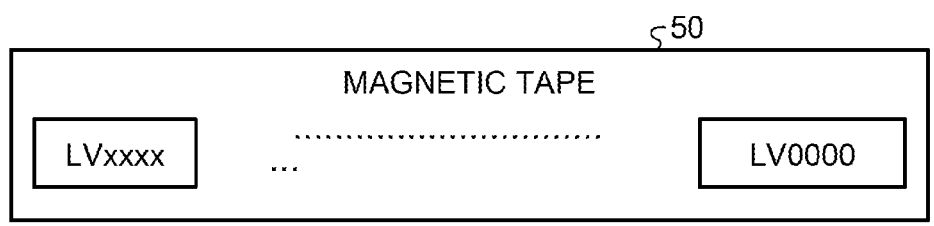
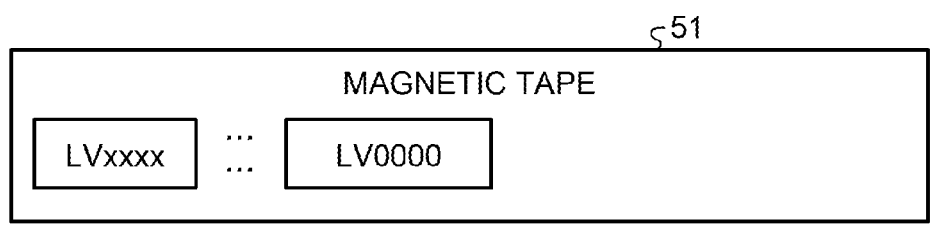

| LOGICAL VOLUME NAME | PHYSICAL TAPE NAME | VALIDITY FLAG | RECORDING LOCATION | | NUMBER OF TIMES OF RECALL |
| --- | --- | --- | --- | --- | --- |
| | | | SECTOR VALUE | BLOCK ID | |
| LV0000 | PV000A | 1 | 50 | 033500 | 10 |
| | PV000B | 1 | 03 | 000100 | |
| LV0001 | PV000 | 1 | 10 | 002000 | 0 |
| LV0002 | PV000B | 0 | 40 | 033000 | 3 |
| | PV000C | 1 | 05 | 000050 | |
| ... | ... | ... | ... | ... | ... |
| ... | ... | ... | ... | ... | ... |
| LV0998 | PV000B | 1 | 15 | 002500 | 1 |
| LV0999 | PV000B | 1 | 25 | 003500 | 0 |

| PHYSICAL TAPE NAME | FINAL RECORDING LOCATION | | PLACE WHERE PHYSICAL TAPE IS KEPT |
| --- | --- | --- | --- |
| | SECTOR VALUE | BLOCK ID | |
| PV000A | 50 | 040010 | TAPE DRIVE 15 |
| PV000B | 04 | 000110 | CELL 60 |
| ... | ... | ... | ... |
| ... | ... | ... | ... |
| PV00AA | 20 | 003000 | CELL 61 |

FIG.6

| LOGICAL VOLUME NAME | NUMBER OF TIMES OF RECALL | RECORDING LOCATION SECTOR VALUE |
|---|---|---|
| LV0011 | 1 | 7 |
| LV0012 | 1 | 23 |
| LV0013 | 1 | 50 |
| LV0014 | 3 | 11 |
| LV0015 | 3 | 35 |
| LV0016 | 3 | 41 |
| LV0017 | 10 | 3 |
| LV0018 | 10 | 36 |
| LV0019 | 10 | 55 |

FIG.7

| PLACE WHERE PHYSICAL TAPE OF COPY SOURCE IS KEPT | PLACE WHERE PHYSICAL TAPE OF COPY DESTINATION IS KEPT | INVALIDATION OF COPY SOURCE | PHYSICAL TAPE TO BE USED AT TIME OF RECALL PROCESSING |
|---|---|---|---|
| IN CELL | IN CELL | TO BE DONE | COPY DESTINATION |
| IN TAPE DRIVE | IN TAPE DRIVE | TO BE DONE | COPY DESTINATION |
| IN TAPE DRIVE | IN CELL | NOT TO BE DONE | COPY SOURCE |
| IN CELL | IN TAPE DRIVE | TO BE DONE | COPY DESTINATION |

VIRTUAL TAPE DEVICE AND VIRTUAL TAPE DEVICE CONTROL METHOD

CROSS-REFERENCE TO RELATED APPLICATION

This application is a continuation of International Application No. PCT/JP2011/072105, filed on Sep. 27, 2011, and designating the U.S., the entire contents of which are incorporated herein by reference.

FIELD

The embodiments discussed herein are related to a virtual tape device and a virtual tape device control method.

BACKGROUND

A magnetic tape storage device writes data accepted from a server into magnetic tape which is set in a tape drive, and transmits data read from the magnetic tape to the server.

When reading/writing data, the magnetic tape storage device causes magnetic tape to travel as far as a target location. Consequently, it takes a considerably long time to read/write data in a random location. Therefore, there is a virtual tape system in which a disk device is provided between the server and the magnetic tape storage device and the disk device is utilized as a cache.

A virtual tape system will now be described with reference to FIG. 14. FIG. 14 is a diagram illustrating a configuration of a virtual tape system. As illustrated in FIG. 14, a virtual tape system 900 includes a library device 910 and a virtual tape device 920. Furthermore, the virtual tape system 900 is connected to a server 901 to be able to communicate with each other.

The library device 910 includes magnetic tapes 911 to 914 that stores data and tape drives 915 and 916 in which each magnetic tape is set. Furthermore, the virtual tape device 920 includes a TVC (Tape Volume Cache) 921 that retains a plurality of logical volume data.

Upon accepting writing of logical volume data "A" from the server 901 in such the virtual tape system 900, the virtual tape device 920 retains the logical volume data "A" on the TVC 921. Upon accepting an unmount order of the logical volume data "A" from the server 901, the virtual tape device 920 retains the logical volume data "A" on some magnetic tape in the library device 910. Furthermore, before the amount of all logical volume data exceeds the capacity of the TVC 921, the virtual tape device 920 deletes old logical volume data from the TVC 921.

Furthermore, upon receiving reading of logical volume data "B" from the server 901, the virtual tape device 920 determines whether the logical volume data "B" exists on the TVC 921. Upon determining that the logical volume data "B" exists on the TVC 921, the virtual tape device 920 transfers the logical volume data "B" from the TVC 921 to the server 901.

On the other hand, if the logical volume data "B" does not exist on the TVC 921, the virtual tape device 920 reads the pertinent logical volume data "B" from magnetic rape in the library device 910 and retains the logical volume data "B" on the TVC 921. And the virtual tape device 920 transfers the logical volume data "B" from the TVC 921 to the server 901. By the way, processing of reading logical volume data deleted from the TVC 921, from magnetic tape and storing the logical volume data on the TVC 921 is called recall.

In the virtual tape system 900, the library device 910 is virtually executed on the virtual tape device 920 in this way. As a result, reading/writing accepted from the server 901 is made fast.

Patent Literature 1: Japanese Laid-open Patent Publication No. 11-31376

In the above-described related technique, however, there is a problem that it is not possible in some cases to read logical volume data in a short time at the time of recall processing.

Specifically, in recall processing in the related virtual tape device, the magnetic tape is traveled as far as a location where logical volume data is stored, in response to a mount order, and the logical volume data is read. In a case where the retained logical volume data is written in the rear of a physical tape, however, travel time of the magnetic tape becomes long and consequently it takes a considerably long time to read at the time of recall.

SUMMARY

According to an aspect of an embodiment, a virtual tape device includes a determination unit and a copy creation unit. The determination unit determines, when deleting some logical volume data among a plurality of logical volume data stored on a first physical tape, whether to conduct copy processing to store a copy of the logical volume data to be deleted onto a second physical tape on the basis of a storage location of the logical volume data to be deleted on the first physical tape. The copy creation unit stores, when the determination unit has determined to conduct the copy processing, a copy of the logical volume data on the second physical tape so as to cause spacing between a storage location of the logical volume data on the second physical tape and a head location on the second physical tape to become shorter than spacing between a storage location of the logical volume data on the first physical tape and a head location on the first physical tape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating copy creation of logical volume data conducted by a virtual tape device;

FIG. 4 is a diagram illustrating an example of information stored as a logical volume management table;

FIG. 5 is a diagram illustrating an example of information stored as a physical tape management table;

FIG. 6 is a diagram illustrating an operation conducted by a copy determination unit to determine whether to create a copy of logical volume data;

FIG. 7 is a diagram illustrating physical tape selected by a physical tape selection unit;

DESCRIPTION OF EMBODIMENTS

Preferred embodiments of the present invention will be explained with reference to accompanying drawings. By the way, the invention is not restricted by the embodiments. And embodiments can be combined suitably in a range that processing contents are not contradictory to each other.

[a] First Embodiment

Configuration of Virtual Tape System

Figure 1:
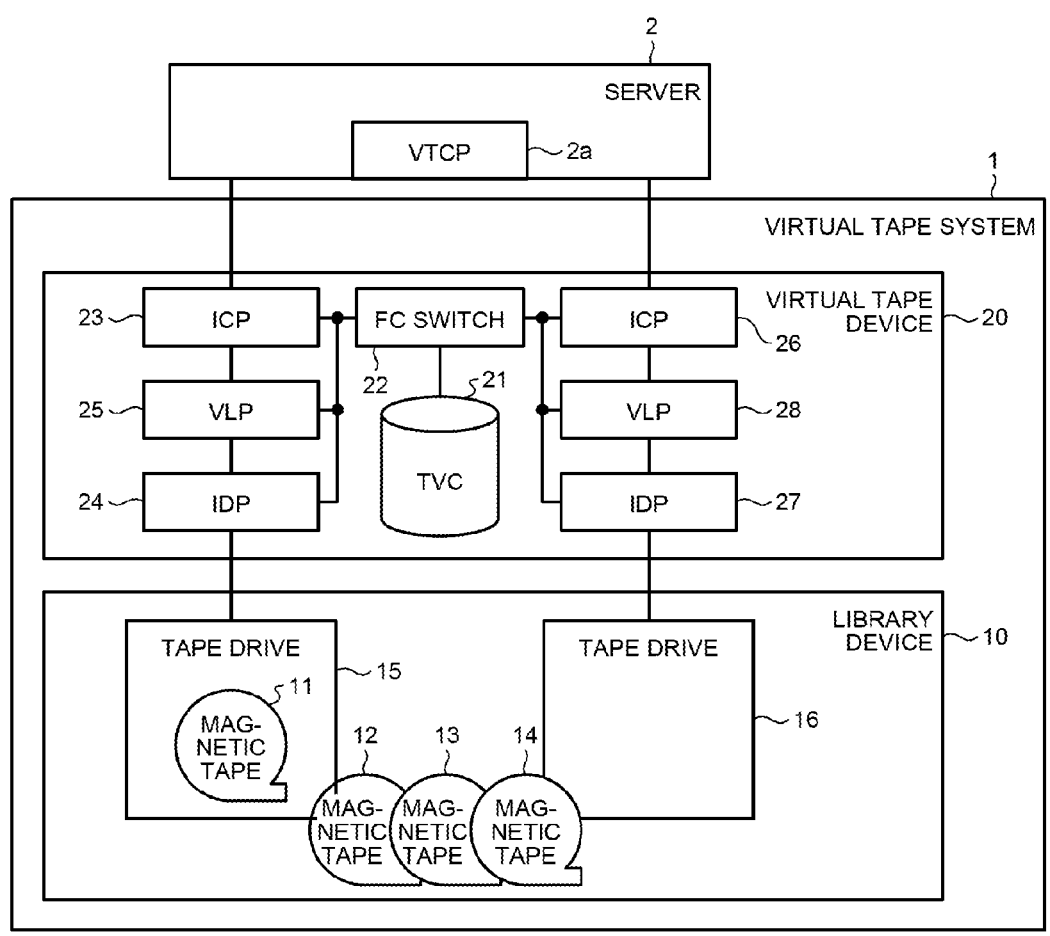
FIG. 1 is a block diagram illustrating a configuration of a virtual tape system.

FIG. 1 is a block diagram illustrating a configuration of a virtual tape system. As illustrated in FIG. 1, a virtual tape system 1 includes a library device 10 and a virtual tape device 20. Furthermore, the virtual tape system 1 is connected to a server 2 to be able to communicate with each other.

The server 2 requests the virtual tape device 20 to conduct mount processing of a physical drive. Here, mount processing of a physical drive refers to setting magnetic tape included in the library device 10 into a tape drive and bringing about a state in which reading/writing of data stored on the magnetic tape is possible. And the server 2 specifies a logical drive and a logical volume selected by a VTCP (Virtual Tape Control Program) 2a and requests the virtual tape device 20 to read or write data.

Furthermore, the server 2 requests the virtual tape device 20 to conduct unmount processing of a physical drive. Here, unmount processing refers to unmount magnetic tape that is set in a tape drive included in the library device 10.

The library device 10 includes magnetic tapes 11 to 14 and tape drives 15 and 16. The number of tape volumes and the number of tape drives are not restricted to those illustrated, but may be changed.

The magnetic tapes 11 to 14 are preserved in a cell which is not illustrated. In a case where each magnetic tape is mounted, the magnetic tape is taken out from the cell by a robot or a hand which is not illustrated and set into the tape drive 15 or 16. In an example illustrated in FIG. 1, the magnetic tape 11 is set in the tape drive 15 and magnetic tapes 12 to 14 is preserved in the cell. By the way, in the ensuing description, the magnetic tape is described as a physical tape as the occasion may demand.

Each of the tape drives 15 and 16 performs data writing on each magnetic tape set thereon, and causes each magnetic set thereon to travel and performs reading stored data. By the way, the tape drive is referred to as a physical drive as well.

The virtual tape device 20 includes a TVC (Tape Volume Cache) 21 and a FC (Fibre Channel) switch 22. Furthermore, the virtual tape device 20 includes ICPs (Integrated Channel Processors) 23 and 26, IDPs (Integrated Device Processors) 24 and 27, and VLPs (Virtual Library Processors) 25 and 28.

The TVC 21 includes a RAID (Redundant Arrays of Inexpensive Disks) storage and a file system, and retains a plurality of logical volume data. The FC switch 22 is a switch that connects various devices in a fiber channel interface to each other. The FC switch 22 connects each of the ICPs 23 and 26, the IDPs 24 and 27, and the VLPs 25 and 28 to the TVC 21.

The ICP 23 is a server including a CPU (Central Processing Unit) and a main storage device. The ICP 23 mounts a channel interface card. The ICP 23 is connected to the server 2 by using a storage connection interface such as an FCLINK (registered trade mark) or OCLINK (registered trade mark).

Upon accepting mount processing of a physical drive from the server 2, the ICP 23 requests the VLP 25 to conduct mount processing of a logical drive. And upon being notified that the mount processing is finished of the logical drive by the VLP 25, the ICP 23 notifies the server 2 that the mount processing of the physical drive is finished.

After the mount processing of the logical drive is finished, the ICP 23 writes accepted data into the TVC 21 in accordance with a data write request accepted from the server 2. Furthermore, after the mount processing of the logical drive is finished, the ICP 23 reads accepted data from the TVC 21 in accordance with a data read request accepted from the server 2.

Furthermore, upon accepting unmount processing of a physical drive from the server 2, the ICP 23 requests the VLP 25 to conduct unmount processing of a logical drive. And upon being notified that unmount processing of the logical drive is finished from the VLP 25, the ICP 23 notifies the server 2 that the unmount processing of the physical drive is finished.

The IDP 24 is a server including a CPU and a main storage device. The IDP 24 has a data bus for the tape drive 15 in the library device 10. Upon receiving mount processing of a logical drive from the VLP 25 described later, the IDP 24 controls the tape drive 15, reads data stored on each magnetic tape, and writes the read data into the TVC 21. In other words, the IDP 24 mounts a logical volume on a logical drive included in the TVC 21.

Furthermore, upon accepting unmount processing of a logical drive from the VLP 25, the IDP 24 controls the tape drive 15 and writes data stored in the TVC 21 onto each magnetic tape. Furthermore, the IDP 24 requests the library device 10 to remove magnetic tape set in the tape drive 15, from the tape drive 15. Upon being notified that the magnetic tape is removed from the tape drive 15, by the library device 10, the IDP 24 notifies the VLP 25 that the unmount processing of the logical drive is finished.

The VLP 25 is a server including a CPU and a main storage device. Upon accepting mount processing of a logical drive from the ICP 23, the VLP 25 determines whether the specified logical volume exists in the TVC 21. Upon determining that the specified logical volume exists in the TVC 21, the VLP 25 notifies the ICP 23 that the mount processing of the logical drive is finished.

On the other hand, upon determining that the specified logical volume does not exist in the TVC 21, the VLP 25 requests the IDP 24 to conduct mount processing of the logical drive. If the logical volume is mounted on a logical drive included in the TVC 21, the VLP 25 completes the mount processing of the logical drive by opening a file in the mounted logical volume. The VLP 25 notifies the ICP 23 that the mount processing of the logical drive is finished.

Furthermore, the VLP 25 accepts unmount processing of a logical drive from the ICP 23, and requests the IDP 24 to conduct unmount processing of the logical drive. Upon being notified by the IDP 24 that unmount processing of the logical drive is finished, the VLP 25 notifies the ICP 23 that the unmount processing of the logical drive is finished.

By the way, a configuration of the ICP 26 is similar to that of the ICP 23. A configuration of the IDP 27 is similar to that of the IDP 24. A configuration of the VLP 28 is similar to that of the VLP 25. Here, therefore, description concerning the configurations of the ICP 26, the IDP 27 and the VLP 28 will be omitted.

When deleting arbitrary logical volume data from the TVC 21 storing a plurality of logical volume data, in the virtual tape system 1 having the above-described configuration, the virtual tape device 20 executes processing described hereafter. In other words, the virtual tape device 20 determines whether to create a copy for the logical volume data to be deleted, on the basis of a location on a first physical tape where the logical volume data is stored. And upon determining to create a copy, the virtual tape device 20 causes the logical volume data to be stored before a predetermined location on a second physical tape different from the first physical tape storing the logical volume data and creates a copy for the logical volume data.

FIG. 2 is a diagram illustrating copy creation of logical volume data conducted by the virtual tape device. Here, a case where the virtual tape device 20 deletes logical volume data "LV0000" from the TVC 21 is taken as an example. As illustrated in FIG. 2, logical volume data "LVxxxx" is stored near head of a magnetic tape 50 and the logical volume data "LV0000" is stored near end of the magnetic tape 50. By the way, in the ensuing description, the logical volume data "LV0000" is referred to as "LV0000" as the occasion may demand.

"LV0000" exists near the end of the magnetic tape 50. And it is impossible to read "LV0000" in a short time at the time of recall processing. Therefore, the virtual tape device 20 determines to create a copy of "LV0000." And the virtual tape device 20 stores "LV0000" into vicinity of the head of the magnetic tape 51 and creates a copy for "LV0000." In other words, spacing between a storage location of "LV0000" on the magnetic tape 51 and the head location on the magnetic tape 51 becomes shorter than spacing between a storage location of "LV0000" on the magnetic tape 50 and the head location on the magnetic tape 50.

When deleting logical volume data from the TVC 21, the virtual tape device 20 copies the logical volume data onto a second physical tape different from a first physical tape storing the logical volume data on the basis of the location on the first physical tape storing the logical volume data in this way. At this time, the virtual tape device 20 copies the logical volume data near the head of a different physical tape and thereby shortens the spacing between a storage location of the logical volume data on the different physical tape and the head location on the different physical tape. As a result, the virtual tape device 20 can read the logical volume data in a short time at the time of recall processing.

Configuration of VLP

Figure 3:
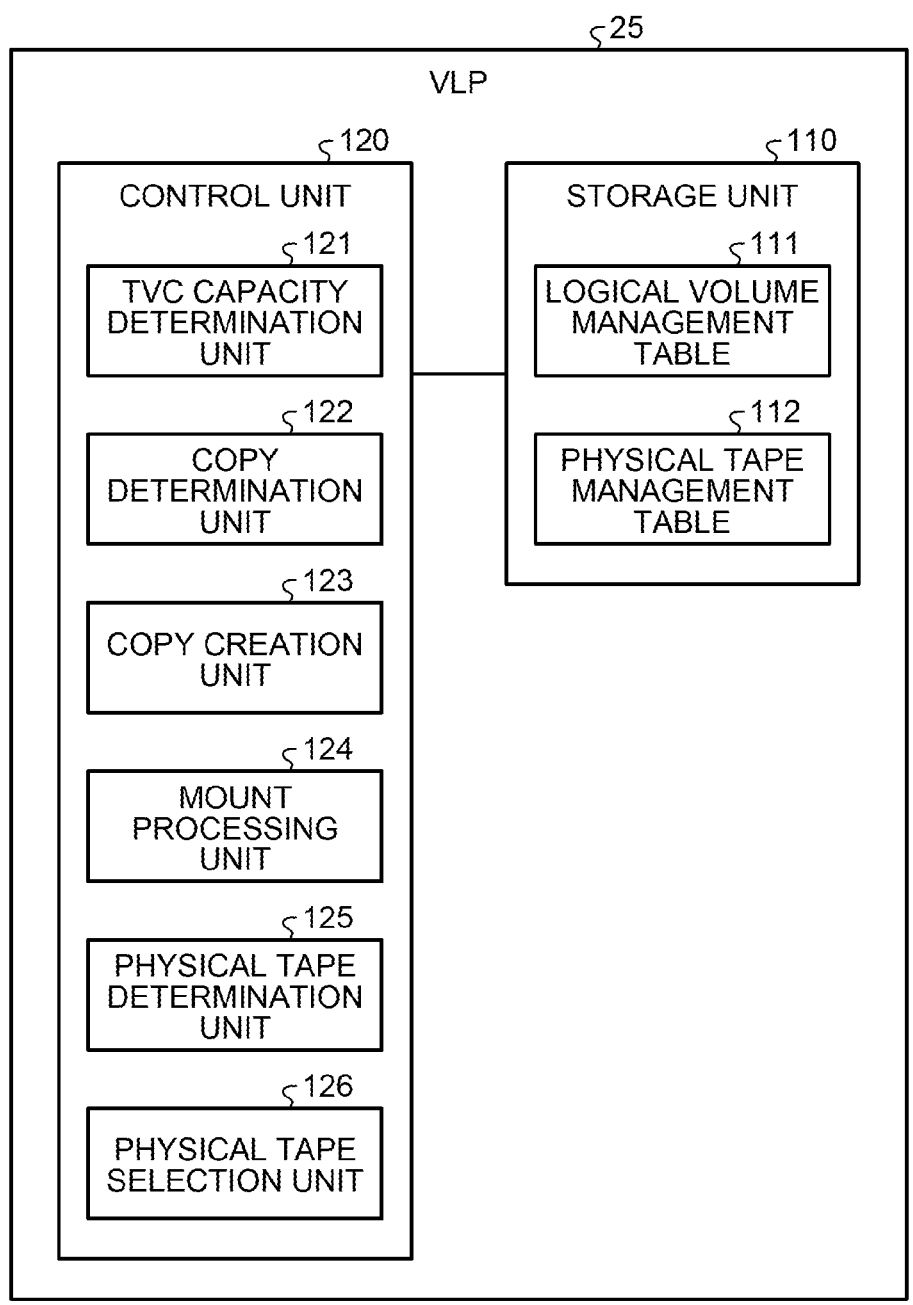
FIG. 3 is a block diagram illustrating a configuration of a VLP.

A configuration of the VLP 25 will now be described with reference to FIG. 3. FIG. 3 is a block diagram illustrating a configuration of the VLP. By the way, only a configuration relating to a function of reading logical volume data in a short time at the time of recall processing is illustrated in FIG. 3. As illustrated in FIG. 3, the VLP 25 includes a storage unit 110 and a control unit 120.

The storage unit 110 is, for example, semiconductor memory elements. The storage unit 110 includes a logical volume management table 111 and a physical tape management table 112.

The logical volume management table 111 stores information obtained by associating a physical tape name retaining data of a logical volume, a recording location on the physical tape, and the number of times the logical volume was recalled. An example of information stored as the logical volume management table 111 will now be described with reference to FIG. 4. FIG. 4 is a diagram illustrating an example of information stored as the logical volume management table.

As illustrated in FIG. 4, the logical volume management table 111 stores "logical volume name," "physical tape name," "validity flag," "recording location," and "the number of times of recall."

Here, the "logical volume name" stored in the logical volume management table 111 indicates a name of a volume in which one logical volume data is recorded. For example, a value such as "LV0000" or "LV0001" is stored in the "logical volume name."

The "physical tape name" indicates a name of tape on which logical volume data is recorded. For example, a value such as "PV000A" or "PV000B" is stored in the "physical tape name."

The "validity flag" indicates whether the logical volume data recorded on a physical tape is valid or invalid. In other words, the "validity flag" indicates whether to cause the physical tape storing the logical volume data to be an object to be read at the time of recall processing of the logical volume data. For example, "1" is stored in the "validity flag" to indicate that the logical volume data is valid and is made to be an object to be read. Or "0" is stored in the "validity flag" to indicate that the logical volume data is invalid and is not made to be an object to be read.

The "recording location" indicates a location on a physical tape on which the logical volume data is previously stored. The "recording location" is represented by a "sector value" and a "block ID."

The "sector value" indicates a value identifying each of sectors obtained by dividing magnetic tape from the head to the end into sectors. For example, the sector value is a natural number in the range of 1 to 60. For example, "50," "03" or the like is stored in the "sector value."

The "block ID" indicates an identifier of each of blocks written from the head of a physical tape. The "block ID" is a natural number beginning with 000000 and obtained by adding one by one. For example, a value such as "033500" or "000100" is stored in the "block ID."

"The number of times of recall" indicates the number of times recall processing was executed. For example, a value such as "1," "0" or "3" is stored in "the number of times of recall."

In the example illustrated in FIG. 4, the logical volume management table 111 indicates that logical volume data having a logical volume name "LV0000" is stored in two physical tape volumes "PV000A" and "PV000B" and the number of times of recall is ten. Furthermore, it is indicated that a recording location of "LV0000" in "PV000A" is "50" in sector value and "033500" in block ID and a recording location of "LV0000" in "PV000B" is "03" in sector value and "000100" in block ID. Furthermore, both "PV000A" and "PV000B" are valid.

In the same way, the logical volume management table 111 indicates that logical volume data having a logical volume name "LV0002" is stored in two physical tape volumes "PV000B" and "PV000C" and the number of times of recall is three. Furthermore, it is indicated that a recording location of "LV0002" in "PV000B" is "40" in sector value and "033000" in block ID and a recording location of "LV0002" in "PV000C" is "05" in sector value and "000050" in block ID. Furthermore, "PV000B" is invalid and "PV000C" is valid.

Referring back to FIG. 3, the physical tape management table 112 stores information obtained by associating a place where physical tape is kept and a final recording location with each other. An example of information stored as the physical tape management table 112 will be described with reference to FIG. 5. FIG. 5 is a diagram illustrating an example of information stored as a physical tape management table.

As illustrated in FIG. 5, the physical tape management table 112 stores "physical tape name," "final recording location" and "place where physical tape is kept"

Here, "physical tape name" stored in the physical tape management table 112 is similar to "physical tape name" stored in the logical volume management table 111. Furthermore, "final recording location" indicates a location on a physical tape where writing can be started. The "final recording location" is represented by "sector value" and "block ID." By the way, the "sector value" and the "block ID" in the "final recording location" are similar to the "sector value" and the "block ID" described as to the logical volume management table 111.

The "place where physical tape is kept" indicates a place in the library device 10 where a physical tape is kept. For example, "tape drive 15" is stored in the "place where physical tape is kept" to indicate that the physical tape is set in the tape drive 15. Or, for example, "cell 60" is stored in the "place where physical tape is kept" to indicate that the physical tape is archived in a cell and information identifying a location in the cell is "60."

In an example illustrated in FIG. 5, the physical tape management table 112 indicates that a physical tape having a physical tape name "PV000A" exists in the tape drive 15 and new logical volume data is stored from a location having a sector value "50" and a block ID "040010." Furthermore, the physical tape management table 112 indicates that a physical tape having a physical tape name "PV000B" exists in "cell 60" and new logical volume data is stored from a location having a sector value "04" and a block ID "000110."

Referring back to FIG. 3, the control unit 120 includes a TVC capacity determination unit 121, a copy determination unit 122, a copy creation unit 123, a mount processing unit 124, a physical tape determination unit 125, and a physical tape selection unit 126.

The TVC capacity determination unit 121 determines whether a capacity of data stored by the TVC 21 has exceeded a predetermined threshold at predetermined periods. In a case where the TVC capacity determination unit 121 determines that the capacity of data stored by the TVC 21 has exceeded the predetermined threshold, the TVC capacity determination unit 121 causes the copy determination unit 122 to determine whether to create a copy.

When deleting arbitrary logical volume data from the TVC 21 which stores a plurality of logical volume data, the copy determination unit 122 executes the following processing. That is, the copy determination unit 122 refers to the logical volume management table 111 and determines whether to create a copy for logical volume data to be deleted, on the basis of a location on a physical tape where the logical volume data is stored.

An operation for the copy determination unit 122 to determine whether to create a copy of the logical volume data will now be described with reference to FIG. 6. FIG. 6 is a diagram illustrating an operation conducted by the copy determination unit to determine whether to create a copy of logical volume data. By the way, items indicated in FIG. 6 are an example in which the "logical volume name," "the number of times of recall" and "sector value" are extracted from information stored as the logical volume management table 111.

Furthermore, in the ensuing description, the recall frequency is regarded as "low" in a case where the number of times of recall is in the range of zero to two, the recall frequency is regarded as "slightly high" in a case where the number of times of recall is in the range of three to nine, and the recall frequency is regarded as "high" in a case where the number of times of recall is at least ten. Furthermore, in a case where the sector value is in the range of one to twenty, the location on the physical tape is regarded as "forward." In a case where the sector value is in the range of 21 to 40, the location on the physical tape is regarded as "middle." In a case where the sector value is in the range of 41 to 60, the location on the physical tape is regarded as "backward."

For example, in a case where the location on a physical tape where logical volume data to be deleted is "middle" or "backward" and the recall frequency of the logical volume data to be deleted is "high," the copy determination unit 122 determines to create a copy for the logical volume data.

As illustrated in FIG. 6, logical volume data having a logical volume name "LV0018" is 36 in sector value and ten in the number of times of recall. Therefore, the copy determination unit 122 determines that the location on the physical tape is "middle" and the recall frequency is "high." In the same way, logical volume data having a logical volume name "LV0019" is 55 in sector value and ten in the number of times of recall. Therefore, the copy determination unit 122 determines that the location on the physical tape is "backward" and the recall frequency is "high."

Furthermore, in a case where the location on a physical tape where the logical volume data to be deleted is stored is "backward" and the number of times of recall of the logical volume data to be deleted is "slightly high," the copy determination unit 122 determines to create a copy for the logical volume data.

As illustrated in FIG. 6, logical volume data having a logical volume name "LV0016" is 41 in sector value and the number of times of recall is three. Therefore, the copy determination unit 122 determines that the location on the physical tape is "backward" and the recall frequency is "slightly high."

By the way, the references for determining whether to create a copy for logical volume data is not restricted to those used here. For example, in a case where the location on the physical tape where the logical volume to be deleted is stored is "backward" and the recall frequency is "high," the copy determination unit may determine to create a copy for the logical volume data.

Or in a case where the location on the physical tape where the logical volume data to be deleted is stored is "middle" or "backward" and the recall frequency is "slightly high" or "high," the copy determination unit 122 may determine to create a copy for the logical volume data.

Furthermore, in a case where the location on the physical tape where the logical volume data to be deleted is "backward," the copy determination unit 122 may determine to create a copy for the logical volume data without depending upon the number of times of recall.

Referring back to FIG. 3, in a case where the copy determination unit 122 determines to create a copy, the copy creation unit 123 executes the following processing. That is, the copy creation unit 123 stores the logical volume data before a predetermined location on a second physical tape different from a first physical tape storing the logical volume data and creates a copy for the logical volume data.

For example, the copy creation unit 123 extracts a "physical tape name" associated with the "logical volume name" determined to create a copy, from the logical volume management table 111. And the copy creation unit 123 extracts a "physical tape name" different from the extracted "physical tape name" from the physical tape management table 112, and selects a physical tape that is forward in final recording location.

The copy creation unit 123 creates a copy for the logical volume data in the forward part on the selected physical tape. And the copy creation unit 123 updates the logical volume management table 111 and the physical tape management table 112 after finishing the copy creation.

Furthermore, when creating copies of a plurality of logical volume data, the copy creation unit 123 creates copies of logical volume data in order of decreasing number of times of recall.

The mount processing unit 124 accepts mount processing and unmount processing from the ICP 23, and executes mount processing and unmount processing for a logical drive.

For example, upon accepting mount processing, the mount processing unit 124 determines whether a logical volume for which mount processing is accepted exists on the TVC 21. Upon determining that a logical volume for which mount processing is accepted exists on the TVC 21, the mount processing unit 124 executes mount processing onto a logical drive and notifies the ICP 23 that the mount processing is completed. As a result, the ICP 23 notifies the server 2 that the mount processing is completed.

Furthermore, upon determining that the logical volume for which amount processing is accepted does not exist on the TVC 21, the mount processing unit 124 causes the physical tape determination unit 125 to determine the number of physical tape volumes storing the logical volume data for which mount processing is accepted. After the logical volume for which mount processing is accepted is stored onto the TVC 21, the mount processing unit 124 executes mount processing onto a logical drive and notifies the ICP 23 that the mount processing is completed.

Furthermore, upon accepting unmount processing, the mount processing unit 124 requests the IDP 24 to retain data stored on the TVC 21 onto a physical tape.

In a case where the mount processing unit 124 determines that the logical volume for which mount processing is accepted does not exist on the TVC 21, the physical tape determination unit 125 executes the following processing. That is, the physical tape determination unit 125 determines whether physical tape of copy source storing logical volume data for which mount processing is accepted and physical tape of copy destination having a copy of logical volume data for which reading is accepted exist.

For example, the physical tape determination unit 125 extracts the number of "physical tape names" associated with a "logical volume name" corresponding to a logical volume for which reading is accepted, from the logical volume management table 111, and determines whether the number of "physical tape names" is two.

In a case where the number of "physical tape names" is two, the physical tape determination unit 125 determines that physical tape of copy source and physical tape of copy destination exist. And the physical tape determination unit 125 causes the physical tape selection unit 126 to select some physical tape from which the pertinent logical volume data can be read in a shortest time.

On the other hand, in a case where the number of "physical tape names" is one, the physical tape determination unit 125 determines that only either one of physical tape of copy source or physical tape of copy destination exists. And the physical tape determination unit 125 notifies the IDP 24 that only either one of physical tape of copy source or physical tape of copy destination exists. As a result, the IDP 24 reads logical volume data from the selected physical tape and stores the logical volume data read onto the TVC 21.

In a case where the physical tape determination unit 125 determines that physical tape of copy source and physical tape of copy destination exist, the physical tape selection unit 126 selects some physical tape from which the logical volume data can be read in the shortest time, on the basis of a place where each physical tape is kept.

An operation for the physical tape selection unit 126 to select a physical tape will now be described with reference to FIGS. 7 to 11. FIG. 7 is a diagram illustrating a physical tape selected by the physical tape selection unit. FIG. 7 illustrates "physical tape used at the time of recall processing" selected on the basis of "place where physical tape of copy source is kept" and "place where physical tape of copy destination is kept," and whether there is "invalidation of copy source."

In a case where the place where the physical tape of copy source is kept and the place where the physical tape of copy destination is kept are the same condition, the physical tape selection unit 126 selects the physical tape of copy destination as illustrated in FIG. 7. For example, in a case where "place where physical tape of copy source is kept" and "place where physical tape of copy destination is kept" are "in cell," the physical tape selection unit 126 selects the physical tape of copy destination.

Figure 8:
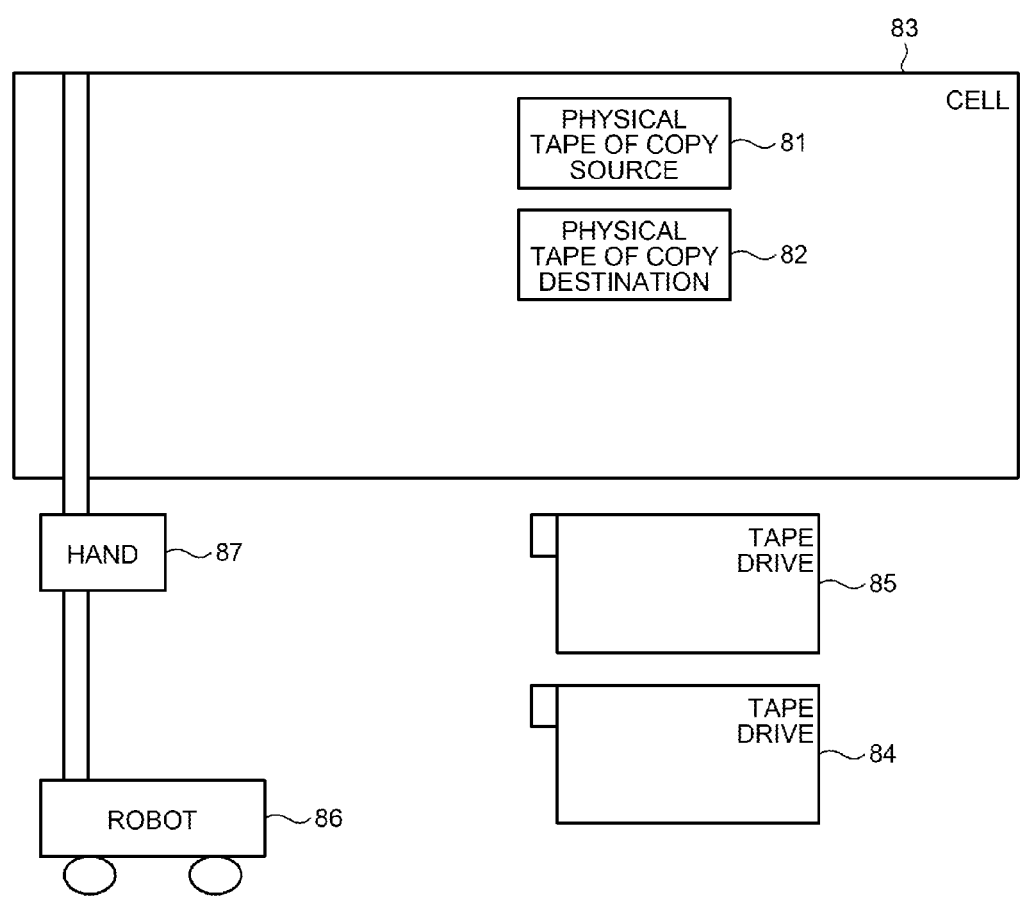
FIG. 8 is a diagram illustrating an example of a case where "place where physical tape of copy source is kept" and "place where physical tape of copy destination is kept" are "in cell"

FIG. 8 is a diagram illustrating an example of a case where "place where physical tape of copy source is kept" and "place where physical tape of copy destination is kept" are "in cell." As illustrated in FIG. 8, a physical tape of copy source 81 and a physical tape of copy destination 82 are archived in a cell 83, and tape is not set in tape drives 84 and 85. In this case, both the physical tape of copy source 81 and the physical tape of copy destination 82 are taken out from inside of the cell by using a robot 86 and a hand 87. In such a case, the physical tape selection unit 126 determines that the logical volume data can be read from the physical tape of copy destination 82 on which the logical volume data is recorded on the forward part of the tape, in the shortest time and selects the physical tape of copy destination 82.

Furthermore, in a case where "place where physical tape of copy source is kept" and "place where physical tape of copy destination is kept" are "in tape drive," the physical tape selection unit 126 selects the physical tape of copy destination.

Figure 9:
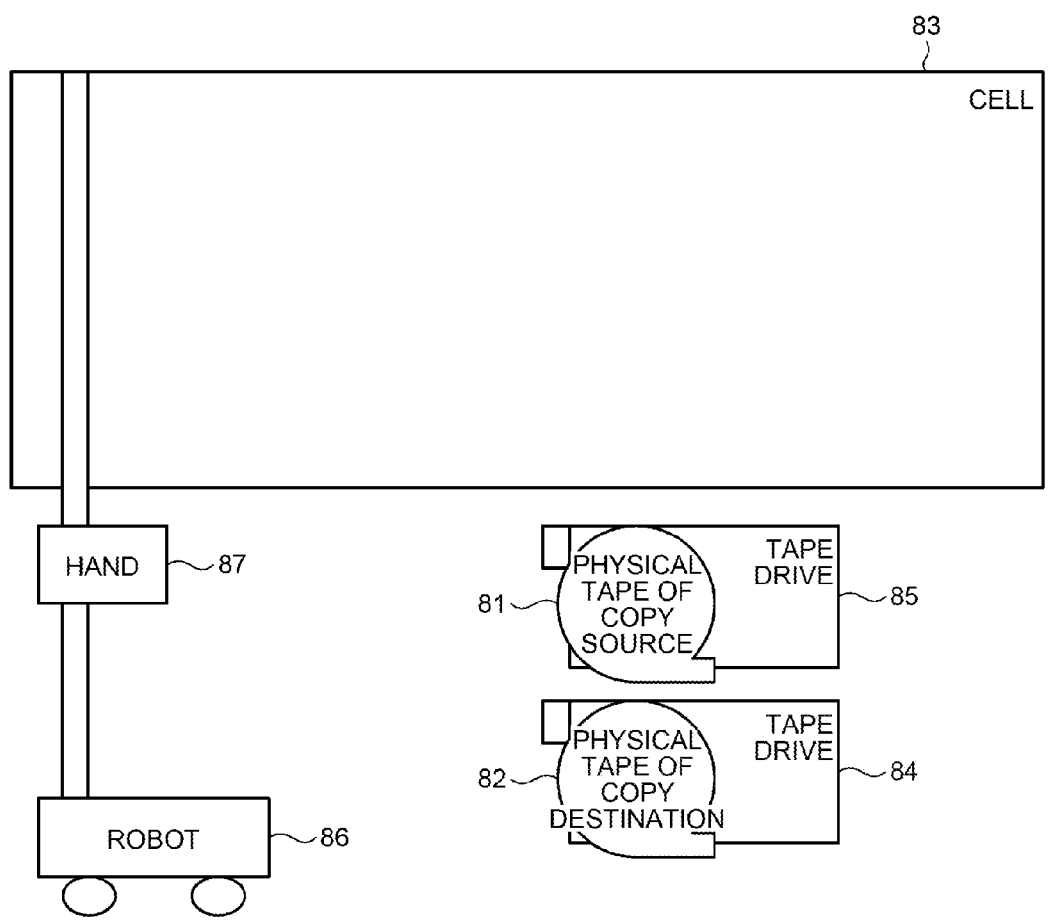
FIG. 9 is a diagram illustrating an example of a case where "place where physical tape of copy source is kept" and "place where physical tape of copy destination is kept" are "in tape drive"

FIG. 9 is a diagram illustrating an example of a case where "place where physical tape of copy source is kept" and "place where physical tape of copy destination is kept" are "in tape drive." As illustrated in FIG. 9, the physical tape of copy source 81 is set in the tape drive 85 and the physical tape of copy destination 82 is set in the tape drive 84. In this case, it is not necessary to take out any tape from the inside of the cell 83. In such a case, the physical tape selection unit 126 determines that the logical volume data can be read from the physical tape of copy destination 82 on which the logical volume data is stored in the forward part in the shortest time, and selects the physical tape of copy destination 82.

Furthermore, in a case where the physical tape of copy destination is set in a tape drive and the physical tape of copy source is archived in a cell, i.e., the physical tape of copy source is not set in a tape drive, the physical tape selection unit 126 selects the physical tape of copy destination as illustrated in FIG. 7.

Figure 10:
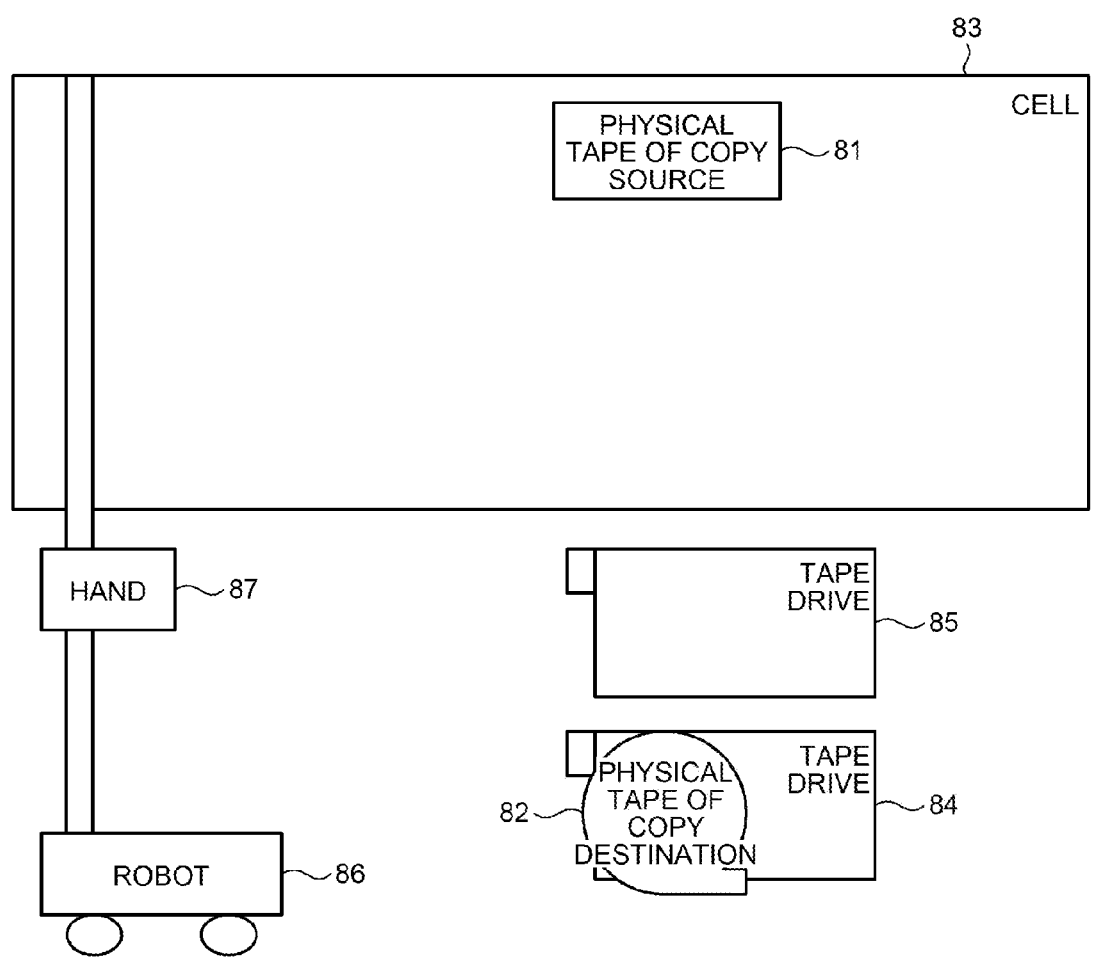
FIG. 10 is a diagram illustrating an example of a case where physical tape of copy destination is set in a tape drive and physical tape of copy source is not set in a tape drive.

FIG. 10 is a diagram illustrating an example of a case where physical tape of copy destination is set in a tape drive and physical tape of copy source is not set in a tape drive. As illustrated in FIG. 10, the physical tape of copy source 81 is archived in the cell 83 and the physical tape of copy destination 82 is set in the tape drive 84. For reading the logical volume data stored on the physical tape of copy source 81 in this case, the physical tape of copy source 81 is taken out from the inside of the cell 83 by using the robot 86 and the hand 87 and in addition, magnetic tape is caused to travel as far as a location where the logical volume data is stored. On the other hand, for reading logical volume data stored on the physical tape of copy destination 82, it is not necessary to take out the physical tape of copy destination 82 from the inside of the cell 83, but it suffices to cause magnetic tape to travel as far as the forward part on which the logical volume data is stored. In such a case, the physical tape selection unit 126 determines that the logical volume data can be read from the physical tape of copy destination 82 in the shortest time, and selects the physical tape of copy destination 82.

In a case where the physical tape selection unit 126 has selected the physical tape of copy destination as a physical tape from which the logical volume data can be read in the shortest time, the physical tape selection unit 126 excepts the physical tape of copy source from objects of reading the logical volume data. For example, the physical tape selection unit 126 stores "0" in "validity flag" associated with "physical tape name" indicating the physical tape of copy source in the logical volume management table 111.

Furthermore, in a case where the physical tape of copy source is set in a tape drive and the physical tape of copy destination is archived in the cell, i.e., is not set in the tape drive, the physical tape selection unit 126 selects the physical tape of copy source as illustrated in FIG. 7.

Figure 11:
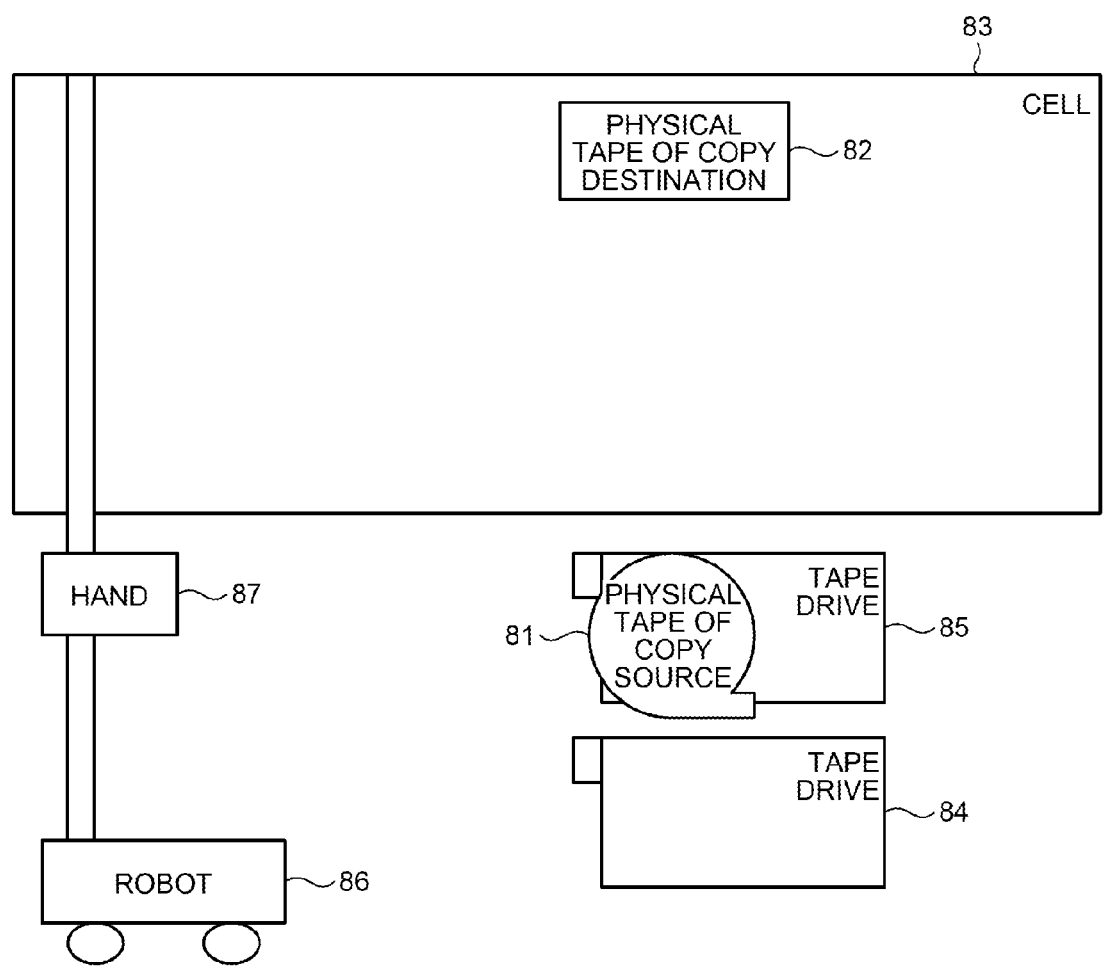
FIG. 11 is a diagram illustrating an example of a case where physical tape of copy source is set in a tape drive and physical tape of copy destination is not set in a tape drive.

FIG. 11 is a diagram illustrating an example of a case where physical tape of copy source is set in a tape drive and physical tape of copy destination is not set in a tape drive. As illustrated in FIG. 11, the physical tape of copy source 81 is set in the tape drive 85 and the physical tape of copy destination 82 is archived in the cell 83. For reading logical volume data stored on the physical tape of copy source 81 in this case, magnetic tape is caused to travel as far as a location where the logical volume data is stored. However, it is not necessary to take out the magnetic tape from the inside of the cell 83. On the other hand, for reading logical volume data stored on the physical tape of copy destination 82, the physical tape of copy destination 82 is taken out from the inside of the cell 83 by using the robot 86 and the hand 87. In such a case, logical volume data can be read in a shorter time by causing the physical tape of copy source 81 set in the tape drive 85 to travel as far as a location where the logical volume data is stored as compared with taking out the physical tape of copy destination 82 from the inside of the cell. Therefore, the physical tape selection unit 126 determines that the logical volume data can be read from the physical tape of copy source 81 in the shortest time, and selects the physical tape of copy source 81.

By the way, in this case, the physical tape selection unit 126 does not except the physical tape of copy source from objects of reading logical volume data. In other words, in the logical volume management table 111, "1" is continuously stored in "validity flag" associated with "physical tape name" indicating the physical tape of copy source.

The physical tape selection unit 126 requests the IDP 24 to set the selected physical tape in a tape drive. As a result, the IDP 24 reads logical volume data from the selected physical tape and stores the read logical volume data on the TVC 21.

Processing Procedure of Processing Conducted by VLP

A processing procedure of processing conducted by the VLP will now be described with reference to FIG. 12 and FIG. 13. Here, copy processing will be described with reference to FIG. 12, and recall processing will be described with reference to FIG. 13.

Copy Processing

Figure 12:
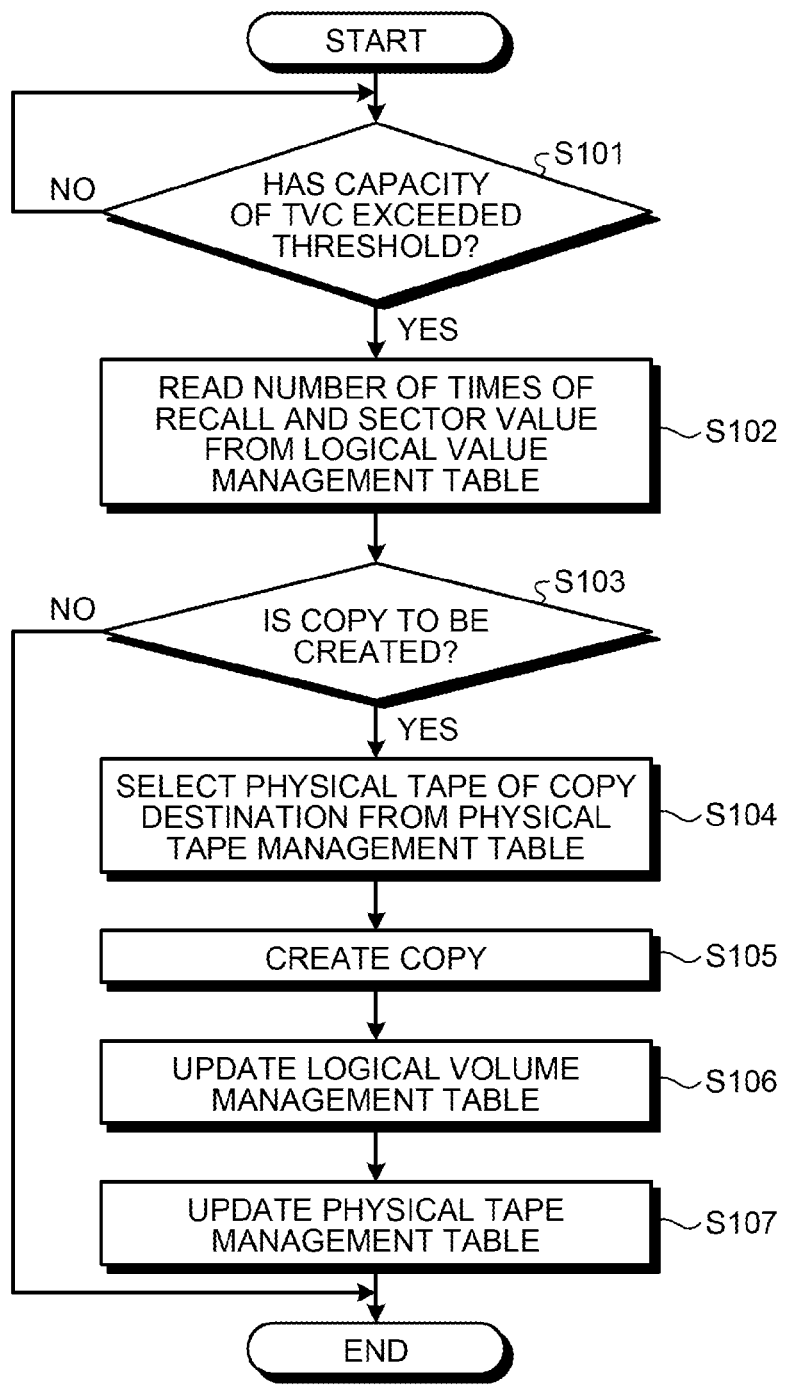
FIG. 12 is a flow chart for explaining a processing procedure of copy processing conducted by the VLP.

FIG. 12 is a flow chart for explaining a processing procedure of copy processing conducted by the VLP. As illustrated in FIG. 12, the TVC capacity determination unit 121 determines at predetermined periods whether a capacity of data stored on the TVC 21 has exceeded a predetermined threshold (step S101). In a case where the TVC capacity determination unit 121 determines that the capacity of data stored on the TVC 21 has exceeded the predetermined threshold (step S101, Yes), the copy determination unit 122 reads the number of times of recall and a sector value from the logical volume management table 111 (step S102).

Subsequently, the copy determination unit 122 determines whether to create a copy (step S103). In a case where the copy determination unit 122 determines not to create a copy (step S103, No), the copy determination unit 122 finishes processing. On the other hand, in a case where the copy determination unit determines to create a copy (step S103, Yes), the copy creation unit 123 selects the physical tape of copy destination from the physical tape management table 112 (step S104).

And the copy creation unit 123 causes the selected physical tape to create a copy (step S105). Subsequently, after the copy creation is finished, the copy creation unit 123 updates the logical volume management table 111 (step S106) and updates the physical tape management table 112 (step S107).

Recall Processing

Figure 13:
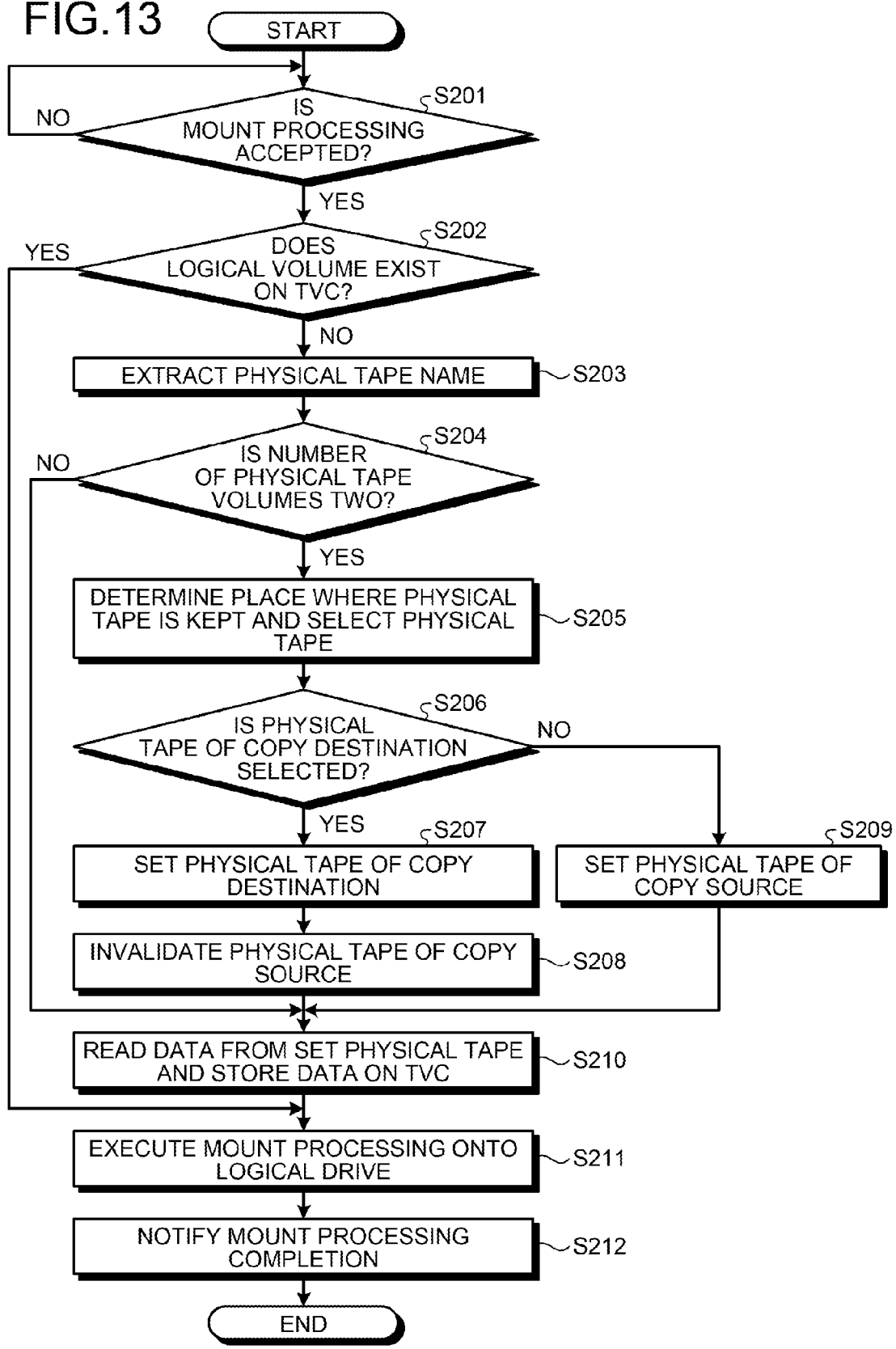
FIG. 13 is a flow chart for explaining a processing procedure of recall processing conducted by the VLP.
Figure 14:
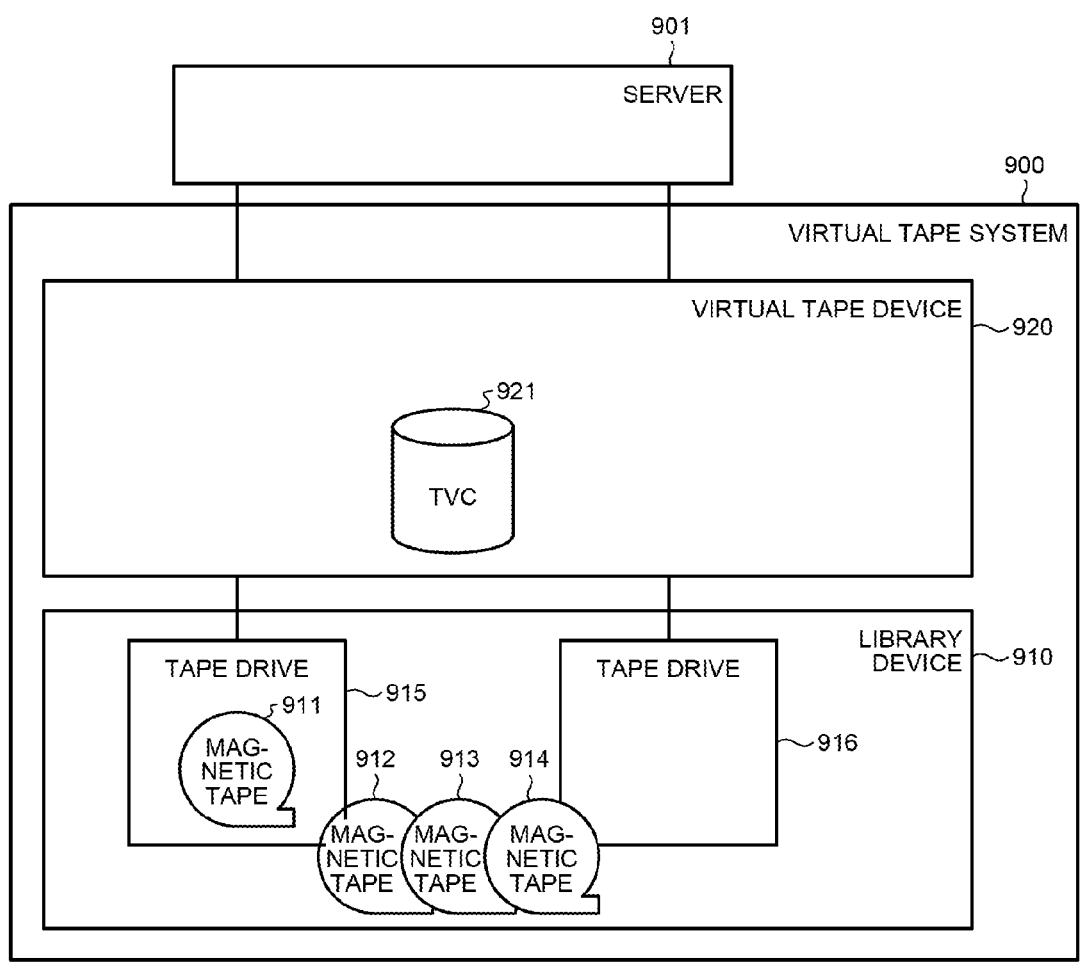
FIG. 14 is a diagram illustrating a configuration of a virtual tape system.

FIG. 13 is a flow chart for explaining a processing procedure of recall processing conducted by the VLP. By the way, processing in the range of step S203 to step S210 in FIG. 13 corresponds to the recall processing.

As illustrated in FIG. 13, the mount processing unit 124 determines whether mount processing is accepted from the ICP 23 (step S201). In a case where the mount processing unit 124 determines that the mount processing is accepted (step S201, Yes), the mount processing unit 124 determines whether a logical volume for which the mount processing is accepted exists on the TVC 21 (step S202).

In a case where the mount processing unit 124 determines that a logical volume for which the mount processing is accepted exists on the TVC 21 (step S202, Yes), the mount processing unit 124 proceeds to step S211. On the other hand, in a case where the mount processing unit 124 determines that a logical volume for which the mount processing is accepted does not exist on the TVC 21 (step S202, No), the physical tape determination unit 125 executes the following processing. That is, the physical tape determination unit 125 extracts a physical tape name from the logical volume management table 111 (step S203). And the physical tape determination unit 125 determines whether the number of physical tape volumes storing the logical volume is two (step S204).

In a case where the physical tape determination unit 125 determines that the number of physical tape volumes storing the logical volume is not two, i.e., is one, the physical tape determination unit 125 proceeds to step S210. On the other hand, in a case where the physical tape determination unit 125 determines that the number of physical tape volumes storing the logical volume is two (step S204, Yes), the physical tape selection unit 126 determines a place where physical tape is kept and selects the physical tape (step S205).

And the physical tape selection unit 126 determines whether physical tape of copy destination is selected (step S206). In a case where the physical tape selection unit 126 determines that physical tape of copy destination is not selected (step S206, No), the physical tape selection unit 126 sets physical tape of copy source in a tape drive (step S209) and proceeds to step S210.

On the other hand, in a case where the physical tape selection unit 126 determines that physical tape of copy destination is selected (step S206, Yes), the physical tape selection unit 126 sets the physical tape of copy destination (step S207). And the physical tape selection unit 126 invalidates the physical tape of copy source (step S208) and proceeds to step S210.

At step S210, the IDP 24 reads data from the set physical tape and stores the data onto the TVC 21 (step S210). Subsequently, the mount processing unit 124 executes mount processing onto a logical drive (step S211) and notifies the ICP 23 that the mount processing is completed (step S212). After the step S212 is finished, the VLP 25 finishes the recall processing.

Effects of First Embodiment

When deleting logical volume data, the virtual tape device 20 copies logical volume data into vicinity of a head on a second physical tape different from a first physical tape storing the logical volume data on the basis of a location on the first physical tape storing the logical volume data. As a result, the virtual tape device 20 can read the logical volume data in a short time at the time of recall processing.

Furthermore, the virtual tape device 20 copies logical volume data that exceed a predetermined threshold in the number of times of recall, in addition to the location on the physical tape where the logical volume data is stored. As a result, tape consumption can be reduced as compared with a case where all logical volume data stored in backward locations on the physical tape.

Furthermore, the virtual tape device 20 copies logical volume data stored in backward locations on the physical tape and expected to exceed the predetermined threshold in the number of times of recall before long. As a result, the virtual tape device 20 can read data having a possibility of being used frequently before long and taking a considerable time to read, in a short time at the time of recall processing.

Furthermore, in a case where the virtual tape device 20 has copied logical volume data onto a different physical tape, the virtual tape device 20 does not invalidate the copy source and manages the copy source and the copy destination temporarily in duplication. As a result, the virtual tape device can select tape that makes the recall time shortest on the basis of places where physical tape of copy source and physical tape of copy destination are kept. For example, in a case where the physical tape of copy source is set in a tape drive and the physical tape of copy destination is archived in the cell, the virtual tape device 20 can complete the recall processing in a short time by selecting the physical tape of copy source.

Furthermore, in a case where the virtual tape device 20 manages the copy source and the copy destination in duplication, memory resources in the virtual tape device 20 are pressed. In a case where the virtual tape device 20 has selected the copy destination at the time of recall operation, the virtual tape device 20 invalidates the physical tape of copy source to prevent the physical tape of copy source from being selected when recall is conducted again. As a result, the virtual tape device 20 can make efficient use of the memory resources.

Furthermore, in a case where a plurality of logical volume data are deleted from the TVC and the plurality of logical volume data are copied onto a different physical tape, the virtual tape device 20 copies the logical volume data in order of decreasing number of times of recall processing. As a result, the virtual tape device 20 can complete recall processing of logical volumes that are high in recall frequency, in a short time.

[b] Second Embodiment

The present invention may be executed in various different forms besides the above-described embodiment. In the second embodiment, therefore, other embodiments included in the present invention will be described.

System Configuration or the Like

Among kinds of processing described in the present embodiment, the whole or a part of processing described as being conducted automatically can also be conducted manually. Or the whole or a part of processing described as being conducted manually can also be conducted automatically by using a known method. Besides, processing procedures, control procedures, and concrete names described in the description or illustrated in the drawings can be changed arbitrarily unless mentioned specially.

Furthermore, information stored in the illustrated storage unit is nothing but an example. It is not necessary to store information as illustrated.

Furthermore, the order of processing at each step in each processing described in each embodiment may be changed according to various loads and use situations. For example, orders of the step S207 and the step S208 illustrated in FIG. 13 may be interchanged.

Furthermore, each of the illustrated constituent units need not be constituted physically as illustrated. For example, in the virtual tape device 20, the ICP 23, the IDP 24, and the VLP 25 may be united. Furthermore, in the VLP 25, the copy determination unit 122 and the copy creation unit 123 may be united. In addition, as for each processing function conducted in each device, the whole or an arbitrary part may be implemented in a CPU and a program analyzed and executed in the CPU, or may be implemented as hardware using a wired logic.

At the time of recall processing, it is possible to read logical volume data in a short time.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual tape device connected to a server and a library device which includes a first physical tape and a second physical tape, the virtual tape device comprising:
   a memory; and
   a processor coupled to the memory, the processor executes a process comprising:
   on receiving a request from the server, reading out data stored in a first physical tape and storing the read data as a logical volume in a storage unit of the virtual tape device;
   determining, when deleting logical volume data from a storage unit provided in the virtual tape device, whether to conduct copy processing to store a copy of the logical volume data to be deleted onto the second physical tape on the basis of a storage location of the logical volume data to be deleted on the first physical tape; and
   storing, when the determining determines to conduct the copy processing, a copy of the logical volume data to be deleted on the second physical tape so as to cause spacing between a storage location of the logical volume data to be deleted on the second physical tape and a head location on the second physical tape to become shorter than spacing between a storage location of the logical volume data to be deleted on the first physical tape and a head location on the first physical tape wherein the memory stores information identifying a physical tape in which a logical volume is stored in association with information identifying the logical volume, the memory further stores information indicating whether the logical volume stored in the associated physical tape is valid or not,
   the processor further executes:
   when the copy of the logical volume data is stored in the second physical tape, storing information indicating valid corresponding to both the first and the second physical tape in the memory,
   when a requested data is stored in both the first and the second physical tapes, and time required for reading out the data is shorter when accessing the first physical tape rather than the second physical tape, storing information indicating valid in the memory corresponding to the first physical tape, and
   when a requested data is stored in both the first and the second physical tapes, and time required for reading out the data is shorter when accessing the second physical tape rather than the first physical tape, storing information indicating invalid in the memory corresponding to the first physical tape, the processor reading out data only from a physical tape which is valid by referring to the memory.

2. The virtual tape device according to claim 1, wherein the determining determines to conduct the copy processing when the spacing between the storage location of the logical volume data to be deleted on the first physical tape and the head location on the first physical tape is longer than a first spacing and a number of times of recall of the logical volume data to be deleted exceeds a first number of times.

3. The virtual tape device according to claim 2, wherein the determining determines to conduct the copy processing when the spacing between the storage location of the logical volume data to be deleted on the first physical tape and the head location on the first physical tape is longer than a second spacing exceeding the first spacing and the number of times of recall of the logical volume data to be deleted exceeds a second number of times less than the first number of times and is less than the first number of times.

4. The virtual tape device according to claim 1, the process further comprising:
   referring, when logical volume data for which reading is accepted from an information processing device has already been deleted from the storage unit, to information indicating logical volume data stored on the first physical tape and logical volume data stored on the second physical tape and determining whether the logical volume data for which reading is accepted is stored in the first physical tape and the second physical tape; and
   selecting, when the determining determines that the logical volume data for which reading is accepted is stored in the first physical tape and the second physical tape, referring to information indicating a place of each physical tape and selecting a physical tape from which the logical volume data is to be read, from the first physical tape and the second physical tape.

5. The virtual tape device according to claim 4, wherein the selecting selects the second physical tape, when a place the first physical tape is kept is same as a place where the second physical tape is kept, or when the second physical tape is mounted in a physical drive and the first physical tape is not mounted in the physical drive.

6. The virtual tape device according to claim 4, wherein the selecting selects the first physical tape, when the first physical tape is mounted in the physical drive and the second physical tape is not mounted in the physical drive.

7. The virtual tape device according to claim 5, wherein after the selecting selects the second physical tape as a physical tape from which the logical volume data is to be read, the selecting does not select the first physical tape as a physical tape from which the logical volume data is to be read.

8. The virtual tape device according to claim 1, wherein, when creating copies of a plurality of logical volume data, the storing creates copies of logical volume data in order of decreasing number of times of recall.

9. A virtual tape device control method for controlling a virtual tape device connected to a server and a library device which includes a first physical tape and a second physical tape, the method comprising:
   on receiving a request from the server, reading out data stored in a first physical tape and storing the read data as a logical volume in a storage unit of the virtual tape device;
   determining, when deleting logical volume data from a storage unit provided in the virtual tape device, whether to conduct copy processing to store a copy of the logical volume data to be deleted onto the second physical tape on the basis of a storage location of the logical volume data to be deleted on the first physical tape; and
   storing, when it is determined to conduct the copy processing, a copy of the logical volume data to be deleted on the second physical tape so as to cause spacing between a storage location of the logical volume data to be deleted on the second physical tape and a head location on the second physical tape to become shorter than spacing between a storage location of the logical volume data to be deleted on the first physical tape and a head location on the first physical tape wherein storing information identifying a physical tape in which a logical volume is stored in association with information identifying the logical volume, and further storing information indicating whether the logical volume stored in the associated physical tape is valid or not, the processor further executes:

when the copy of the logical volume data is stored in the second physical tape, storing information indicating valid corresponding to both the first and the second physical tape in the memory, when a requested data is stored in both the first and the second physical tapes, and time required for reading out the data is shorter when accessing the first physical tape rather than the second physical tape, storing information indicating valid in the memory corresponding to the first physical tape, and when a requested data is stored in both the first and the second physical tapes, and time required for reading out the data is shorter when accessing the second physical tape rather than the first physical tape, storing information indicating invalid in the memory corresponding to the first physical tape, the processor reading out data only from a physical tape which is valid by referring to the memory.

10. The virtual tape device control method according to claim 9, wherein the determining determines to conduct the copy processing when the spacing between the storage location of the logical volume data to be deleted on the first physical tape and the head location on the first physical tape is longer than a first spacing and a number of times of recall of the logical volume data to be deleted exceeds a first number of times.

11. The virtual tape device control method according to claim 10, wherein the determining determines to conduct the copy processing when the spacing between the storage location of the logical volume data to be deleted on the first physical tape and the head location on the first physical tape is longer than a second spacing exceeding the first spacing and the number of times of recall of the logical volume data to be deleted exceeds a second number of times less than the first number of times and is less than the first number of times.

12. The virtual tape device control method according to claim 9, further comprising:

referring, when logical volume data for which reading is accepted from an information processing device has already been deleted from the storage unit, to information indicating logical volume data stored on the first physical tape and logical volume data stored on the second physical tape and determining whether the logical volume data for which reading is accepted is stored in the first physical tape and the second physical tape; and selecting a physical tape from which the logical volume data is to be read, from the first physical tape and the second physical tape, when it is determined that the logical volume data for which reading is accepted is stored in the first physical tape and the second physical tape with reference to information indicating a place of each physical tape.

13. The virtual tape device control method according to claim 12, wherein the selecting selects the second physical tape, when a place the first physical tape is kept is same as a place the second physical tape is kept, or when the second physical tape is mounted in a physical drive and the first physical tape is not mounted in the physical drive.

14. The virtual tape device control method according to claim 12, wherein the selecting selects the first physical tape, when the first physical tape is mounted in the physical drive and the second physical tape is not mounted in the physical drive.

15. The virtual tape device control method according to claim 13, wherein after the second physical tape is selected as a physical tape from which the logical volume data is to be read, the selecting does not select the first physical tape as a physical tape from which the logical volume data is to be read.

16. The virtual tape device control method according to claim 9, wherein, when creating copies of a plurality of logical volume data, the storing creates copies of logical volume data in order of decreasing number of times of recall.

* * * * *